(12) United States Patent
Harkonen et al.

(10) Patent No.: US 9,901,853 B2
(45) Date of Patent: Feb. 27, 2018

(54) METHOD AND APPARATUS FOR WASHING PULP BY MEANS OF INTENSIFIED SUCTION

(71) Applicant: ANDRITZ OY, Helsinki (FI)

(72) Inventors: Pasi Harkonen, Savonlinna (FI); Simo Karjalainen, Savonlinna (FI); Tuomo Lintunen, Savonlinna (FI); Erkki Savolainen, Savonlinna (FI)

(73) Assignee: Andritz Oy, Helsinki (FI)

( * ) Notice: Subject to any disclaimer, the term of this patent is extended or adjusted under 35 U.S.C. 154(b) by 202 days.

(21) Appl. No.: 14/365,860

(22) PCT Filed: Dec. 14, 2012

(86) PCT No.: PCT/FI2012/000048
§ 371 (c)(1),
(2) Date: Jun. 16, 2014

(87) PCT Pub. No.: WO2013/087977
PCT Pub. Date: Jun. 20, 2013

(65) Prior Publication Data
US 2014/0353260 A1     Dec. 4, 2014

(30) Foreign Application Priority Data

Dec. 15, 2011   (FI) ...................................... 20116273

(51) Int. Cl.
*B01D 33/09*     (2006.01)
*B01D 33/46*     (2006.01)

(52) U.S. Cl.
CPC ........... *B01D 33/09* (2013.01); *B01D 33/463* (2013.01)

(58) Field of Classification Search
CPC ............ B01D 33/0006; B01D 33/0009; B01D 33/073; B01D 33/0012; B01D 33/06;
(Continued)

(56) References Cited

U.S. PATENT DOCUMENTS 1,465,156 A * 8/1923 Bucher .............. B01D 33/0012
                                                        210/395
2,489,681 A * 11/1949 Smith ................... B01D 33/09
                                                       137/625.46
(Continued)

FOREIGN PATENT DOCUMENTS

DE       41 23 143       11/1992
FR       1 151 721        2/1958
(Continued)

OTHER PUBLICATIONS

International Search Report cited in PCT/FI2012/000048 dated Mar. 26, 2013.

*Primary Examiner* — Krishnan S Menon
*Assistant Examiner* — Waqaas Ali
(74) *Attorney, Agent, or Firm* — Nixon & Vanderhye P.C.

(57) ABSTRACT

A method and an apparatus for washing a solids-containing suspension by means of a suction drum washer comprising a drum provided with a filtration surface, a main vacuum source such as a drop leg and washing tubes connected to the frame of the suction drum washer. A washing liquid stream is introduced by a first washing tube is directed to contact the pulp layer on the surface of the drum in a point below 10 degrees after the surface of the suspension and a vacuum of at least 0.1 bar greater than the main vacuum source, i.e. intensified suction is applied by means of a separate vacuum source to filtering surface at the contacting point of the first liquid stream and the pulp layer or maximum of 10 degrees before the contacting point. The intensified suction may be utilized also for boosting end of filtration stage (II) and drying stage (IV). Filtrate from the drying stage (IV) can be used at the same washer as a washing liquid at the first or the second washing tube.

10 Claims, 6 Drawing Sheets

Figure 1:
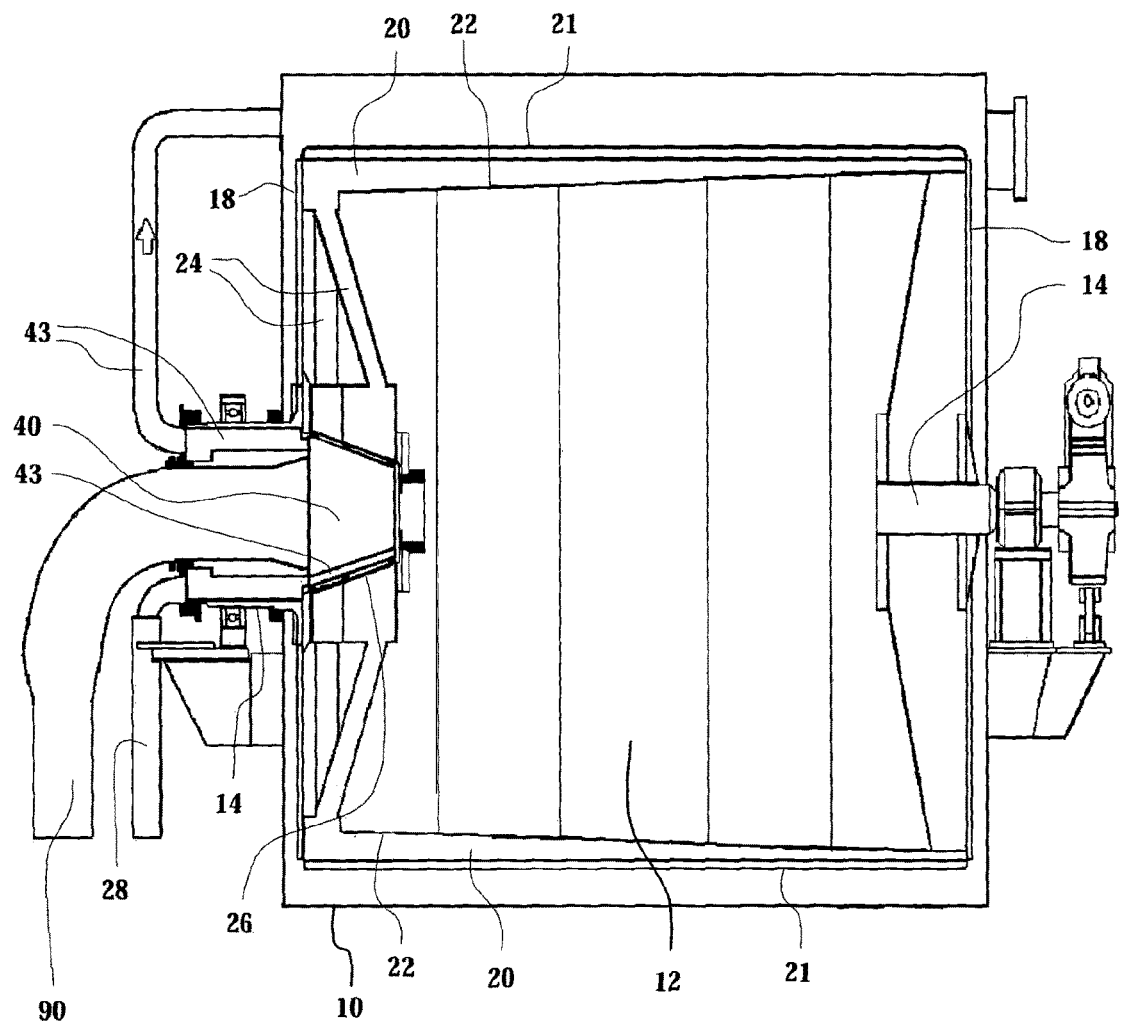

(58) Field of Classification Search
CPC .. B01D 33/15; D21C 9/06; B07B 1/22; B07B 1/26; B07B 1/522; B07B 1/526; B07B 1/54; B30B 9/20
See application file for complete search history.

(56) References Cited

U.S. PATENT DOCUMENTS

| | | | |
|---|---|---|---|
| 3,403,786 A | 10/1968 | Luthi | |
| 4,695,381 A * | 9/1987 | Ragnegard | B01D 33/23 210/403 |
| 6,162,326 A * | 12/2000 | Gommel | B01D 33/073 162/100 |
| 6,258,282 B1 * | 7/2001 | Strid | B01D 33/21 210/331 |
| 6,419,835 B1 | 7/2002 | Virtanen et al. | |
| 2013/0118991 A1 * | 5/2013 | Lekscha | B01D 33/804 210/740 |

FOREIGN PATENT DOCUMENTS

| | | |
|---|---|---|
| GB | 703 695 | 2/1954 |
| JP | 55-147115 | 11/1980 |
| JP | 57-117314 | 7/1982 |

\* cited by examiner

METHOD AND APPARATUS FOR WASHING PULP BY MEANS OF INTENSIFIED SUCTION

This application is the U.S. national phase of International Application No. PCT/FI2012/000048 filed 14 Dec. 2012 which designated the U.S. and claims priority to 20116273 filed 15 Dec. 2011, the entire contents of each of which are hereby incorporated by reference.

OBJECT OF THE INVENTION

The present invention relates to a method and an apparatus for treating solid matter suspension with a vacuum filter. Especially the invention relates to washing a fibrous suspension such as pulp with a suction drum washer. A suction drum washer is generally used in brown stock washing, oxygen stage washing, bleaching washings and washing after screening at a chemical pulp mill.

PRIOR ART

Efficiency of the washing e.g. prior to oxygen delignification is important for obtaining high-quality pulp. In bleaching the washing result of an earlier stage has an influence on the chemical consumption of bleaching and the quality of the pulp. For obtaining and maintaining adequate quality on uniform level and other characteristics of the process set a number of limitations for maximizing the capacity of suction drum filters. Developing the overall capacity of the plant can also require intensification of pulp treatment and increase in the capacity without jeopardizing quality. Most advantageously this is accomplished by means of equipment improvements. The treatment process of an expensive and strategic apparatus should be optimized with respect to capacity, quality and costs, independent on changes in conditions, such as in raw material or quality requirements. When the treatment of pulp requires numerous successive washing stages, intensifying of the washing can even decrease the number of treatments and apparatuses required.

In suction drum washers, the pressure inside the wire-coated filtering surface of a rotating drum is lower than the atmospheric pressure on the outer side. This vacuum is usually created by means of a suction leg (drop leg). The vacuum withdraws pulp suspension in a basin up to the filtering surface, whereby filtrate is withdrawn into the drum and the pulp is filtered to form a layer on the surface of the drum. The rotating drum leads the pulp layer beneath washing liquid sprays into the drying stage and further to a scraper removing the layer and to a discharge screw.

The filtrate penetrating the drum flows into a downward extending pipe, i.e. suction leg, where the weight of the filtrate generates suction that is dependent on the height of the drop leg. The gas within the filtrate decreases the amount of liquid in the suction leg and thus its weight, which decreases the vacuum being generated.

The pressure difference created by the suction leg between the inner and outer sides of the filtering surfaces is increased by the hydrostatic pressure of the suspension in the basin. If the drum is provided with filtrate tubes leading the filtrate into the suction leg, the height of the water column in them decreases the suction applied to the surface of the drum, since the flow is directed upwards when a filtrate tube is below the rotational axis of the drum. This effect annuls the hydrostatic pressure when the filtrate tubes of the drum have been filled. Above the rotational axis of the drum the flow in the filtrate tubes is directed downwards, whereby the height of the water column intensifies the suction. This effect is strongest on the uppermost surface of the drum, unless air entrained in the filtrate tubes decreases this effect.

A known solution for treating pulp is described in publication FI86963 (U.S. Pat. No. 5,264,138). In said publication the suction of the suction leg is directed to the filtering surface in a sector of approximately 240°. In the solution the gas remained inside the drum of the suction drum filter, which gas is detrimental to the suction leg, is led by means of a separate channel in the suction head valve to the exterior of the drum. Publication FI87538 (EP0442697) presents generating suction by means of various pumps and arrangements instead of a suction leg.

Problems Relating to Prior Art

In view increasing the layer thickness, a considerable situation for keeping the pulp layer on the surface of the drum is at a stage where the pulp layer located just above the surface of the suspension is not supported by the drum, but in the vertical direction first below the drum. The pulp layer would be released from the side of the drum under gravity without the effect of suction. At that time the filtrate tubes do not yet intensify the suction of the suction leg. In this stage the consistency of the pulp layer is the lowest and thus its strength is the weakest. Further, in this stage liquid in the pulp layer possibly flowing in the direction of the layer or out of there and suspension flows in the basin can cause releasing of the layer from the drum. Directing a strong flow of washing liquid onto the surface of the pulp layer too early, before the pulp layer has settled firmly enough onto the surface of the drum can release or otherwise damage the pulp layer. These factors limit the thickness of the pulp layer and in practice prevent washing within this zone. If the drum would be in the basin clearly deeper than its axis, the surface of the drum would always support the pulp layer from below. Thereby, the portions of the washing and drying stages would remain short in relation to the filtering stage.

At the end of the filtering stage, in the vicinity of the suspension surface, the growth of the pulp layer is the slowest, since the greatest layer thickness hinders the flow of the suspension through the pulp layer. In this situation, when the intensifying effects of the hydrostatic pressure in the filtrate tubes of the drum or the basin are not available, the vacuum level substantially restricts the increase in the thickness of the pulp layer.

Increasing the rotational speed automatically decreases the thickness of the pulp layer by shortening the filtering time, as well as the durations of other stages. Simultaneously the centrifugal force increases, which tends to release the filtered pulp layer from the surface of the drum.

The vacuum generated by the suction leg is usually in the range of 0.1-0.4 bar. Usually the pressure generated by it is not regulated in any way, but the pressure difference is due to gravity only. The vacuum may alter from the designed value due to leakages and air and water vapor passing into the suction leg together with filtrate. If the vacuum alters, one cannot completely rely on it in retaining the filtered layer when aiming at the highest layer thickness. Also, simultaneously the operation of all process stages, and thus the capacity and washing result alter to some extent. Mainly the rotational speed, the consistency of the suspension and the height level of the suspension are the most significant variables by means of which the process can be adjusted to adapt to changes in vacuum, raw material, or quantitative or qualitative needs.

Increasing the pressure difference would be a straightforward way of increasing the capacity and intensifying various stages. However, it has its limitations. A major pressure difference may excessively tighten an especially fiber-containing pulp layer, whereby its capability of penetrating the pulp suspension or washing liquid is decreased. Further, increased absorption of gas between the fibers or the pores of fine-grained pulp in form of poorly moving bubbles prevents through-flow. A stronger suction worsens this problem, when the gaps between the fibers and the pores shrink and the gas bubbles grow.

Different stages have different requirements for the intensity of the suction, so a common vacuum level is always a compromise. In the filtering stage, the desired pressure level varies due to changes in the condition of the wire and the layer thickness and it changes as the surface of the drum travels in the basin. At the beginning, a minor pressure difference through the pulp layer and the filtering surface is adequate for filtrate flow and even hydrostatic pressure alone, and too efficient a suction withdraws solid material through the filtering surface excessively. Thickening of the pulp layer increases the flow resistance and finally the layer does not increase much, unless the pressure difference is increased.

The washing stage aims at displacement washing, whereby the washing liquid displaces the liquid inside the pulp layer, i.e. cleaner liquid flows from the uniform washing liquid layer on the surface of the drum into the pulp layer and the liquid inside the pulp layer is displaced through the wire and the drum. Due to the compacting of the pulp layer, the liquid does not penetrate and displace the foul liquid inside the pulp in the same ratio as the pressure difference increases. Thus, the washing is more dependent on the action time than the pressure difference.

The suction leg is capable of generating a suction that is adequate in view of both the washing and the increasing of the layer, which suction nevertheless does not hamper these processes by excessively compressing the pulp layer. Generating a stronger suction consumes excessively energy if accomplished with pumps. Their coefficient of efficiency is lower than that of a suction leg, e.g. due to vaporization of liquid and air entrained therein. Suitable pumps with a large volume flow are significantly expensive. Operational advantage obtained by more efficient suction would lead to higher investment and operational expenses. Strong suction obtained by lengthening the suction leg could lead to excess alteration of the suction due to increased vaporization of water and absorption of gases.

The washing tube spraying washing liquid onto the pulp layer and the point of spraying cannot be located down to the vicinity of the suspension surface, since that would lead to release or damage of the filtered layer. The sector, in which washing has not been possible to be performed, starts from the surface and ends in the rotational direction approximately 10-15 degrees later. This sector has not been used for washing, even though no other process stage can be performed at that location. After resurfacing, the lack of liquid layer further allows air to entrain into the pulp layer. Thus, in this sector the current situation is harmful for the operation of the apparatus.

The drying stage between the washing stage and the discharge stage requires an adequately wide sector for liquid removal. This limits the duration of the washing stage. The washing stage begins on the upper surface of the drum, where the filtrate tube best intensifies the suction of the suction leg. Towards the end of the stage the suction weakens as the filtrate tubes get at least partly filled with air and as they turn lower.

Increasing the capacity of a vacuum washer would require increasing the rotational speed of the drum while the thickness of the pulp accumulating onto the surface remains at least almost unchanged, or increasing the thickness of the layer. The aim is best achieved, if both the layer thickness and the rotational speed can be increased. Both ways require further intensifying of the washing stage for keeping the quality of the pulp at least on the present stage.

Increasing the capacity of a suction drum filter and developing the washing should be possible also with existing equipment, because of the long operational life and high price. It should be possible to more freely adjust the duration of the stages of a suction drum filter and the conditions depending on both the pulp being treated and the process requirements, in order to efficiently and continuously optimize the production. The present apparatuses do not have significant adjustment possibilities.

The Purpose and Solution of the Invention

A novel solution has been developed for washing a solids-containing suspension with a suction drum washer. A purpose of the invention is to improve the capacity of a suction drum washer and the quality of the solids being produced, as well as the control thereof, and to provide as wide and versatile a solution as possible for the problems limiting the achievement of these aims. The purpose is achieved such that the method and/or apparatus defined in the preamble of the independent claims are implemented as defined in the characterizing part of the claims. Preferred embodiments of the invention can correspond to the dependent claims.

In accordance with the present invention, to one or several sectors of the drum is directed an intensified suction generated by a separate vacuum source, i.e. a vacuum, which is substantially higher than the vacuum generated by the main vacuum source used in at least the filtering stage, is directed to those sectors of the suction drum where its effects can be utilized to the best extent. Intensified suction directed to a zone preceding the initial point of washing, such as to the end of the filtering stage and/or the initial point of washing allows extending the zone used for washing to the sector following the rising of the pulp layer to the surface of the suspension in the basin and thus increasing the duration of the washing stage. Intensified suction can advantageously also be used for intensifying the filtering, washing and drying operations.

The intensified suction is generated by means of one or several separate vacuum source(s) or other pump(s). For generating the basic suction and for leading the main portion of the filtrate out of the suction drum, a conventional suction leg can still be used, and utilizing the invention may allow compensating its pressure variations and adjusting the vacuum level generated, depending on the separated vacuum source and process.

The intensified suction is most preferably directed to a sector of the drum, where the washing stage can be initiated earlier by said suction. Other advantageous sectors are those on which the pulp layer is developed to its final thickness and/or the pulp layer is kept on the drum after is has arisen above the surface level of the basin and/or where the liquid removal to final thickness takes place. Sectors of intensified suction that are wider than these sectors do not necessarily bring any benefit, since as the volume flows grow, fixed costs and operational costs can rise sharply.

Due to different filtrate produced at various zones of the intensified suction, different pressure level requirement and different amount of gas traveling entrained in the filtrate, it is often advantageous to use at least partly separate and various optimal vacuum sources for at least part of the sectors subjected to the intensified suction. Vacuum levels from a common vacuum source for various sectors can be adjusted to various values e.g. by restricting the gas and liquid flows by means of regulation valves.

With the present equipment, an intensified suction can be generated and directed to the desired sectors of the drum mainly just by making changes to the valve of the suction head and the filtrate channels connected thereto and by connecting the required pipings and vacuum sources to the suction side. This way, improvements of the washer can be accomplished economically and quickly while the central large components remain unchanged.

Various filtrates connected via the intensified suction channels can be led to suitable process stages either even in the same apparatus or the most unclean filtrates can be led to another, in practice upstream, process apparatus. This decreases both the need for clean liquid and for liquid purification. Since expense reasons and liquid treatment capacity often limit the use of clean liquid, the use of the cleanest filtrate as washing liquid as such increases the amount of available washing water. That further increases the efficiency of the washing.

Increasing the pulp layer can be intensified by directing intensified suction from below the surface level in the basin before the pulp layer rises onto the surface. In this stage, the compacting and strengthening of the layer due to the stronger suction assist, due to delay effect, the thick layer in remaining on the drum in the initial stage of the washing and allows initiating the washing earlier. Further, a thickened pulp layer contains less liquid to be displaced at the initial stage of washing, which improves the washing result. After the thick pulp layer has risen from the suspension, by intensified suction it can better be kept on the drum in the initial phase of washing.

Due to the effects of intensified suction, a first washing pipe located lower than before can be mounted in the washer, which pipe is directed to wash the pulp as early as possible, most preferably starting from the suspension surface level. This prevents harmful air from penetrating into or through the pulp layer and the surface area and duration of the washing stage are maximized. The first washing pipe can be made movable and orientable, and its pressure and the form of its spray can be changed for controlling the initial point of the washing and problems related thereto, as well changes in the suspension surface level.

If the intensified suction is directed to sectors located on both sides of the suspension surface level, this is most advantageously accomplished by means of a common channel in the suction side. Filtrates coming from these sectors are highly similar in quality and can thus be led into a same process or container. Preferably this zone of intensified suction is focused so that the midpoint of the valve opening is located at a spot corresponding to the surface level in the basin, whereby both of these sectors providing special advantage are of approximately equal size. This size difference between the sectors may be 10 degrees for optimizing the process.

In the drying stage, after the last washing pipe, where the pulp web is dried to the final consistency, the intensified suction provides clear advantages. A boosted suction increases the discharge consistency of the filter and thus decreases the amount of liquid and impurities contained in the pulp. In the drying stage, compaction of the pulp layer subjected to intensified suction and absorption of air do not hamper the functioning of the stage. The intensity of the vacuum can be limited, especially with fiber materials, by too compact and dry pulp which can be so strong and rigid that it may be peeled off the drum prior to the discharge stage, pushed by the scraper. On the other hand, intensified suction keeps the pulp layer better on the surface of the drum, so that the pulp can be dried to a higher dryness than usual.

A high discharge consistency is especially advantageous when washing brown stock, which after that is led to bleaching or in a situation where process conditions of different treatment stages change considerably as to pH or another variable. Due to intensified suction, the sector needed for the drying stage can be narrowed, i.e. a wider sector can be arranged for the washing stage, correspondingly, e.g. by adding an extra washing pipe or making changes in the flow or orientation or the washing liquid spray.

By means of the widened washing stage due to intensified suction, the washing stage is substantially prolonged. This is advantageous also in view of increasing the rotational speed, because the duration of the washing stage is essential in view of the washing result. If intensified suction is directed also to a stage where the surface of the drum is still in the basin, the thickness of the filtered pulp layer and its consistency can be increased prior to washing. These improvements allow increasing the capacity by increasing the rotational speed of the drum and thus by increasing the amount of washed pulp, while the layer thickness remains at least unchanged, and simultaneously maintaining an earlier or a desired washing efficiency. A sector of intensified suction also allows forming a thicker pulp layer and efficient washing thereof.

From separate zones of intensified suction, the withdrawn filtrates can be distributed under control to be used most preferably as such or slightly treated in various processes, most advantageously in the same washer or as process or washing liquid of upstream treatment stages. The filtrate of the drying stage is most suitable with intensified washing, to be used in the same washer in the initial stage of washing, e.g. in the first two washing pipes. Various embodiments of the invention allow intensifying the washing, so that in the initial stage thereof liquids of poorer quality can be used, if the quality requirements allow that.

If an adjustable positioning of the valve is used in the suction head of the drum for controlling the suctions and filtrates, the directing of the intensified suction can be optimized in various situations, in addition to the control of the vacuum level. Directing intensified suction earlier to the zone within the basin increases the layer thickness and thus the capacity. Changes in the suspension surface level can be compensated. After rising from the suspension surface, terminating the intensified suction later can intensify the washing. The quality of the pulp in the basin, the fiber length and fiber content as well as variations in the quality requirements set for washed pulp, and other changes in the conditions can be controlled even when the apparatus in is operation by means of adjusted timing. If a valve is used, in which the surfaces limiting the zones can be separately positioned, or if replaceable valve components are used having various timings, the initial and terminal points of the intensified suction can be controlled separately. Thus the operation of the expensive washer can be remarkably intensified, controlled and optimized.

Advantages of the invention include e.g. the following:
improves the washing result of the washer, which result can be adjusted as desired and kept constant,
the use of more washing water and an extended washing surface area provides a better washing result, whereby savings are obtained in bleaching expenses, chemical recovery and emissions of pollutants into the environment,
minimization of energy consumption caused by vacuum sources,
improves the adjustability of the process depending on the raw materials and the requirements of the final product,
increases the washing and discharge consistency,
decreases the amount of air passing into the pulp layer and the suction leg,
allows increasing the capacity,
the pressure level of the vacuum source is more uniform and adjustable,
the drying stage filtrate is cleaner and more readily circulated,
filtrates of various cleanliness levels can be distributed to suitable locations for further use, whereby savings are obtained in raw water and liquid handling expenses, and
the method can be applied in existing equipment with small changes.

LIST OF DRAWINGS

In the following, the invention is disclosed in more detail with reference to the appended drawings, of which FIG. 1 illustrates the axial cross section of a suction drum filter washer of prior art.

Figure 2:
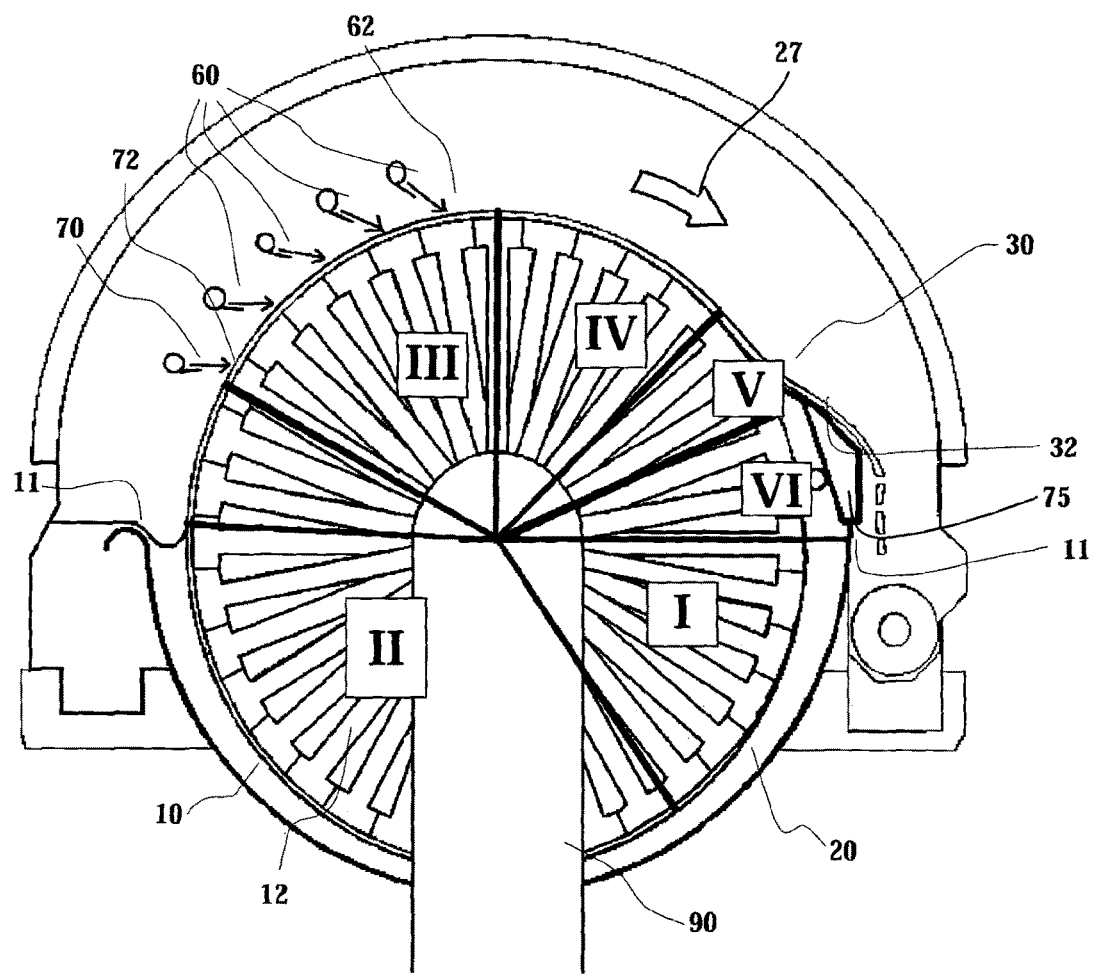
Figure 3:
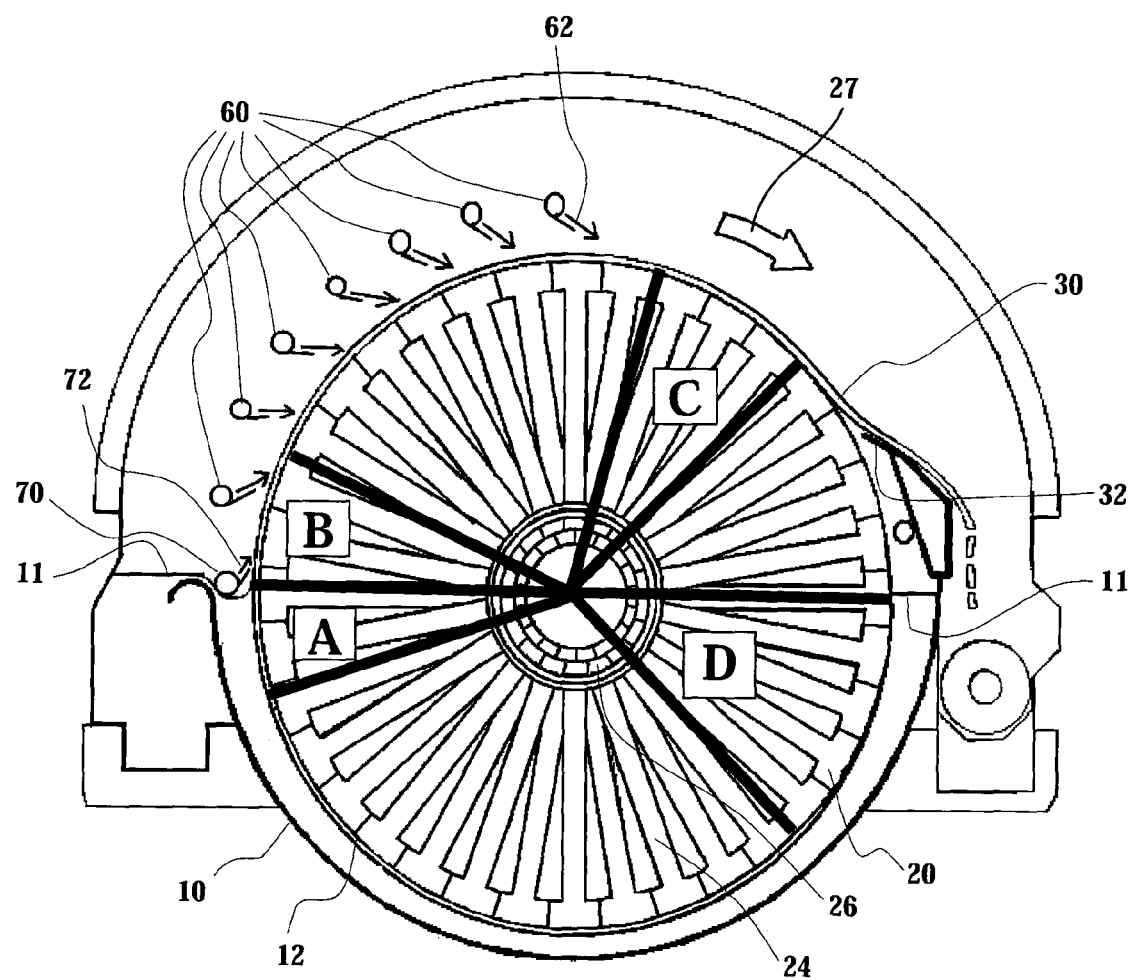
Figure 4:
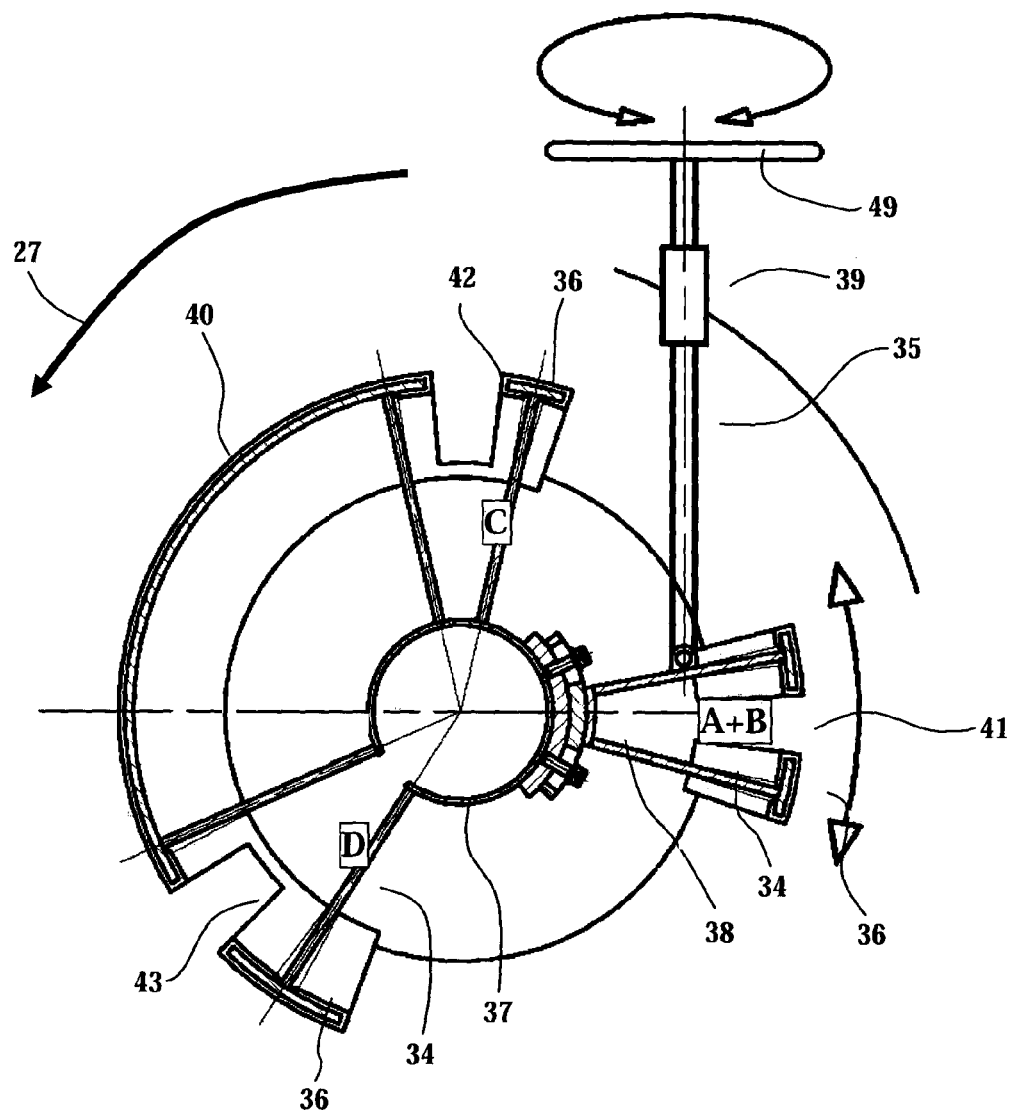
Figure 5:
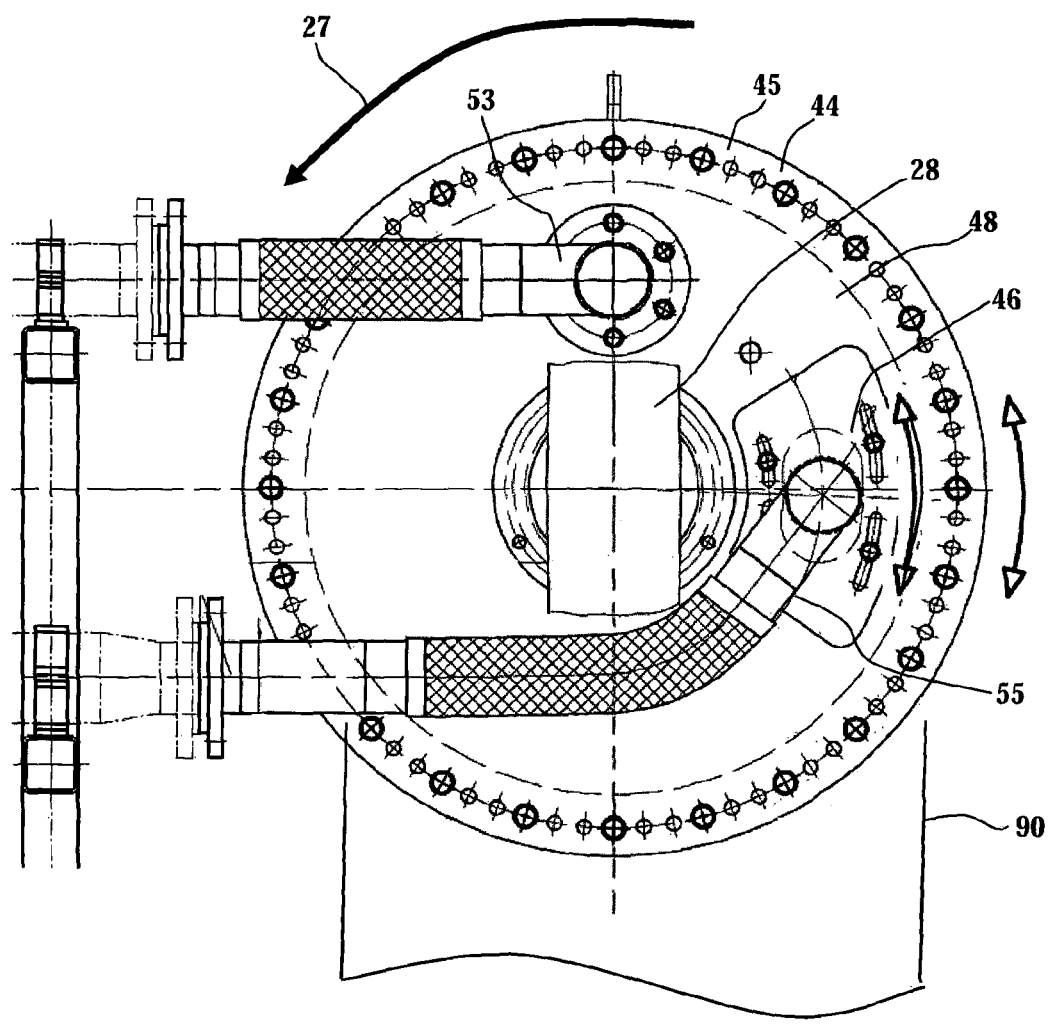
Figure 6:
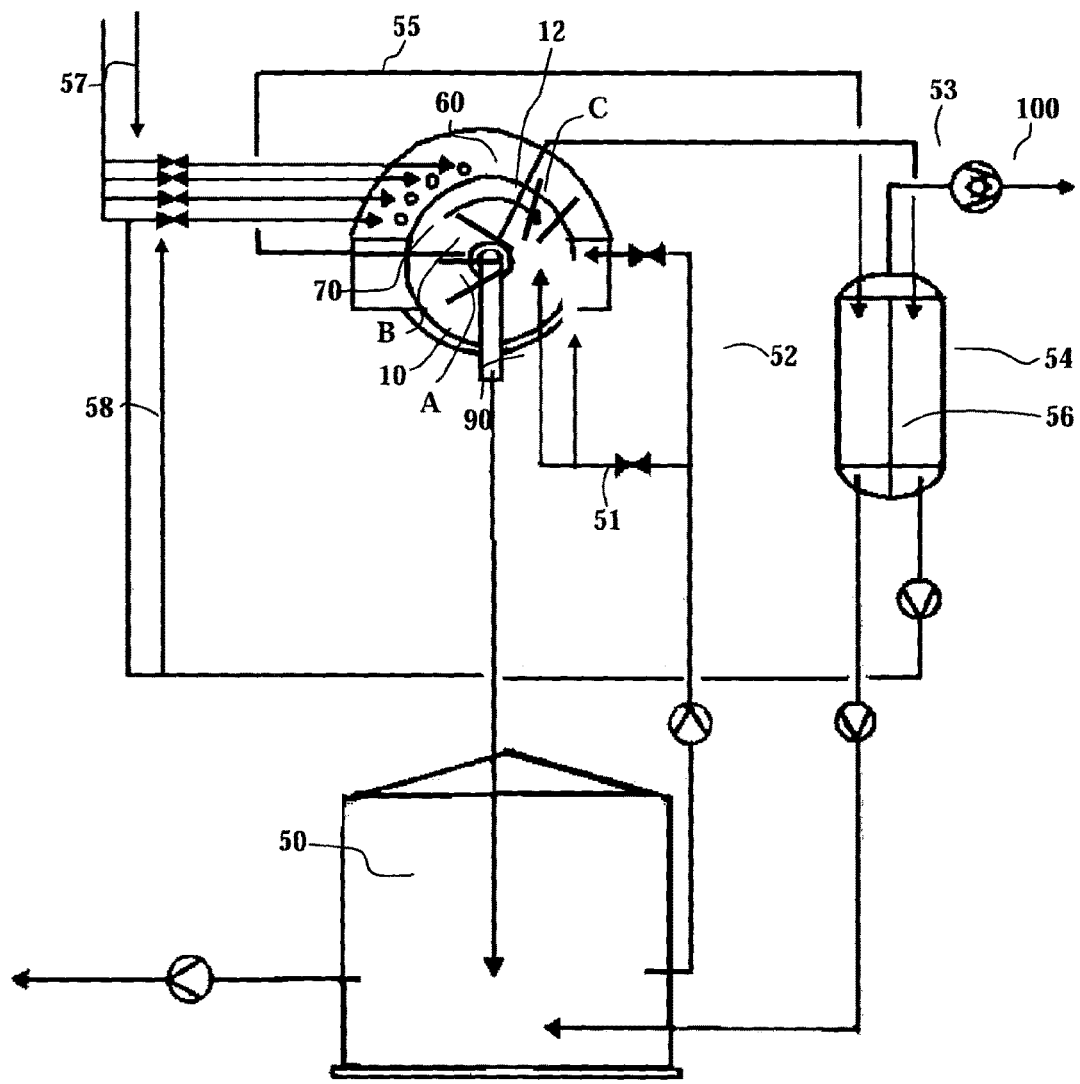

FIG. 2 illustrates a prior art suction drum filter washer and its functional stages seen from the end of the apparatus, showing the filtrate tubes, FIG. 3 illustrates a suction drum filter washer according to a preferred embodiment seen from the face end of the apparatus, showing a distribution box and the filtrate tubes, as well as the sectors that benefit from the intensified suction, FIG. 4 illustrates the cross section of a valve according to a preferred embodiment, controlling gas and filtrate flows, FIG. 5 illustrates a connecting flange with its pipelines connecting a valve according to a preferred embodiment to the suction leg, which valve controls the gas and filtrate flows, and FIG. 6 illustrates a preferred embodiment for the vacuum system and circulation of liquids.

DETAILED DESCRIPTION OF THE INVENTION

FIG. 1 illustrates a suction drum washer of prior art in a longitudinal cross section view. A filter solution with a corresponding structure without a washing stage is presented in patent publication FI 86963 (U.S. Pat. No. 5,264,138). The suction drum washer is comprised mainly of a basin 10, either with open or hood-covered upper part, and a cylindrical drum 12 arranged on a shaft 14, which shaft is supported on bearings at its ends and sealed with respect to the basin 10. The body of the drum 12 comprises end plates 18 connected to an extension of the shaft 14, which plates simultaneously prevent the suspension from entering into the interior of the drum, and longitudinal filtrate compartments 20, by means of which the ends of the drum are fixed to each other and which form the load-bearing structure of the drum. The cover of the filtrate compartments 20 may be either a perforated plate, upon which a wire acting as filtering surface is placed, or the wire 21 itself. The perforated plate may also act as the load-bearing element of the drum. The total number of filtrate compartments 20 on the circumference of the drum is usually approximately 30-40. The portion of one filtrate compartment 20 from the rotational circle of the drum is then correspondingly 9-12 degrees. The filtering surface corresponding to the filtrate compartment 20 is subjected to the same vacuum level.

The bottoms 22 of the filtrate compartments 20 are slanted either to one end of the drum or from the middle to both directions depending on the length of the drum, which usually is over five meters. Filtrate tubes 24 are connected to the bottom 22 of the filtrate compartments in the end of the drum towards which the bottom of the compartment is slanted. They lead the filtrate into a usually conical distribution chamber 26. To the distribution chamber 26 the filtrate tubes 24 are connected to one or two rows. On the surface of the distribution chamber the opening of the end of the filtrate tubes 24 usually have the form of a rectangle, which assists in sectional control of the flow and vacuum. Inside the distribution chamber 26 the filtrate flow of the filtrate tubes is directed as determined by the distribution channel 43 of valve 40 inside the chamber either into the suction leg 90 or into an atmospheric discharge duct 28 for the gas and the filtrate. The valve 40 is fixed in place and does not rotate together with the drum 12. Via the valve 40 it would be possible to correspondingly guide pressurized releasing liquid or gas into the filtrate compartments 20 in the discharge stage V.

FIG. 2 illustrates a prior art face end of a suction drum washer's drum 12 seen from the direction of the suction leg 90. FIG. 2 shows the sectors I-VI of the actual processes of the washer. Vacuum created by the suction leg 90 is directed onto the filtering surfaces of the drum 12, with the exception of the discharge stage V and the initial filtering stage I. In the washers the surface 11 of the fiber suspension in the basin 10 is usually at the highest on the same level as the rotational axis of the drum 12. Normally the surface is kept lower than that.

The suction drum washer functions so that various process stages taking place in different sectors of the drum's 12 rotational circle and these are repeated at a certain point of the drum's surface as the drum rotates at a uniform speed. The initial filtering I takes place first, in which the filtrate tubes 24 are filled with filtrate liquid under hydrostatic pressure and a pulp layer 30 starts accumulating on the surface of the drum 12. Then the suction leg 90 is connected to withdraw suspension from the basin 10 to assist more efficient filtering and accumulation of the pulp layer 30 in the filtering stage II.

After the pulp layer 30 has risen from the suspension, the suction of the suction leg 90 keeps it on the surface of the drum 12. Next, in washing stage III the washing pipes 60 and 70 produce a washing liquid layer on the surface of the pulp layer by means of washing liquid sprays 62 and 72 during the washing stage. Directing the spray into the rotational direction 27, the kinetic energy of the washing liquid and the rotation of the drum restricts the flow of the washing liquid down-hill on the surface of the drum against the rotational direction.

The position of the washing pipes 60 and 70 in FIG. 2 shows that the washing stage III is not initiated at the point of the surface 11 of the suspension, but higher, where the intensive stream of the washing liquid does not anymore damage the pulp layer 30 on the surface of the drum. In the existing washers the first washing pipe 70 is located quite far from the surface 11 of the suspension and the washing stage III is thus initiated not until at least approximately 10 or even over 15 degrees after the pulp suspension 30 has risen from the surface 11 of the suspension. In order to provide an adequately wide sector for drying stage IV, the water layer provided by the washing pipes 60, and thus the washing stage III, does not usually extend further than the highest point of the drum.

The washing stage III is followed by a drying stage IV, where liquid is removed from the pulp layer 30. After that, in the discharge stage V the pulp layer is scraped off from the drum by means of a scraper 32. In the discharge stage V, no suction is applied to the surface of the drum, but the releasing of the pulp layer may be assisted by overpressure air or liquid. Then the wire is washed in the wire washing stage VI by means of pressure sprays produced by the nozzles of pipe 75 prior to a new initial filtering stage I.

FIG. 3 illustrates a suction drum washer arrangement according to a preferred embodiment of the invention. FIG. 3 shows the end of the drum 12 in the basin 10 seen from the direction of the suction leg 90 and the filtrate tubes and compartments in cross section. Differing from FIG. 2, FIG. 3 illustrates sectors, where the use of vacuum sources differing from the main vacuum source provides the most significant advantages. The process stages, I-VI illustrated in FIG. 2 are still performed and by using intensified suction the washing stage III can be extended and the washing thus intensified. In FIG. 3 a zone of intensified suction is directed to one or several sectors A, B and/or C, where the effective vacuum is obtained by means of one or several separate vacuum sources 100 separate from the main vacuum source such as the suction leg 90.

In order to obtain a remarkable benefit from the arrangement, the vacuum of the intensified suction is to be substantially higher, by at least 0.1 bar higher, than the vacuum generated by the main vacuum source. The vacuum source 100 separate from the main vacuum source is thus to be dimensioned to generate this vacuum higher than that produced by the main vacuum source. This vacuum level may be adjustable by changing the operational parameters of the separate vacuum source 100. The maximum intensity of the vacuum is limited, in addition to excess compressing of the pulp layer 30, vaporization of the liquid in the filtrate due to an increased temperature.

Preferably the intensified suction is directed to sector B for keeping the pulp layer 30 solid at the starting point of the washing. Sector B begins at the point where the washing liquid spray 72 hits the pulp layer 30. If the first washing liquid spray 72 hits the surface of the pulp layer 30 later than above the suspension surface 11, the intensified suction can be adjusted to start not until this hitting point, if keeping the pulp layer on the surface does not require intensified suction earlier than that. Sector B terminates at a point where washing stage III could conventionally begin at the earliest, i.e. in the rotational direction 27 10 degrees after the surface 11 of the suspension. The intensified suction can be directed before sector B, whereby the pulp layer 30 is compressed and better endures the starting of the washing. The intensified suction can be continued to the zone of the conventional washing stage III, depending on the properties of the pulp being washed and the desired washing result and capacity.

Because of better adhesion and compactness of the pulp layer 30, the first washing pipe 70 can be located lower than usually, even on the level of the suspension surface 11, or partly or completely below it. The starting point of the washing stage III can be regarded to be the point where the washing liquid spray 72 produced by the first washing pipe contacts the pulp layer 30, at which point damages to the pulp layer are most likely to take place. Because of pouring of the washing liquid, the washing stage III can in practice start even earlier than this. This pouring can extend to the level of the suspension surface 11 at least non-continuously.

The first washing pipe 70 can preferably be arranged to various positions, by means of guide bars or another way in a lateral and/or vertical direction, and/or it can be rotated with respect to its longitudinal axis so that the first washing liquid spray 72 produced by the pipe can be optimally directed. Further, the spraying pressure of the washing liquid spray 72 and other properties of the spray may be adjustable. Means for accomplishing these changes can be manual or mechanized.

In sector B, the intensified suction should not terminate at such a point of the surface where it would lead to damaging of the pulp layer 30. Therefore, the connection of the intensified suction from the channel 41 (FIG. 4) of the valve 40 to the filtrate tube 24 cannot be closed until the corresponding filtrate compartment 20 has completely passed the critical zone. When intensified suction is needed in sector B, it can most securely be terminated only after the filtrate compartment 20 has completely moved from sector B to the zone of conventional washing III of FIG. 2, where the pulp layer 30 no more will be damaged under the influence of washing liquid sprays 62 and 72. If adequate compaction and strengthening of the pulp layer has taken place due to the intensified suction already in the filtering stage II, intensified suction in sector B is not always critical. Then the intensified suction can be terminated due to the delay effect already e.g. in the average 10 degrees before the washing liquid spray 72 contacts the pulp layer 30.

In sector A the intensified suction boosts the growth of the pulp layer 30, and thus increases the capacity of the apparatus. Simultaneously the pulp layer 30 is compacted and its consistency increased, which is essential for starting the washing stage III immediately after the filtering stage II. In order for the capacity effect to be significant, the width of the sector A of intensified suction should with average positioning be at least 10 degrees and it is often even wider, when maximum capacity is sought.

In view of the design of the valve 40, it is most preferable to withdraw the filtrates from sectors A and B via a common channel 41. Then, the same vacuum is directed to them. The benefit from the intensified suction for both the washing result and the capacity is optimal, when A and B have equal width or the widths thereof differ from each other by at the most degrees.

A third advantageous sector C of intensified suction is after the last washing pipe 60 in the drying stage V, where the pulp layer 30 is dried and thickened to the discharge consistency prior to the discharge stage VI. The intensified suction does not have to be directed to the drying zone V as a whole.

In sector D a slight vacuum can be used if needed for accelerated air removal instead of atmospheric degassing. Then this stage can be shorter and the suction leg 90 can be opened earlier, and thus a thicker pulp layer 30 can be obtained. This vacuum can be created with the same vacuum source as the intensified suction, or with a different vacuum source.

FIG. 4 illustrates as a partial cross section with respect to the axis of the drum 12, the main features of a usually conical valve 40 located inside the distribution chamber 26 and controlling the filtrate flows and vacuums. It is sealed outwards so that the vacuum of the suction leg 90 or other vacuum sources 100 cannot withdraw suspension from the basin 10 or air from under the hood. At the locations of the filtrate tubes 24 of the drum where the filtrate flow is led into the suction leg 90, the valve 40 is open and acts mainly as an extension of the suction leg 90.

The valve 40 has channels 41 and 42, which direct the intensified suction to sectors A, and B and C, and correspondingly the filtrates and, gases away therefrom to pipes 53 and 55 connected to the suction head. From sectors that are not partitioned to be separate, the flow travels from the filtrate tubes 24 into the suction leg 90. From the suction leg 90 and from each other the channels 41, 42 and 43 are separated by intermediate walls 34, the outmost end of which is provided with a wide end surface 36 conforming to the inner surface of the distribution chamber 26. The end surface 36 seals adjacent different pressure levels so that it prevents free flow over the intermediate wall 34. If this leakage flow is to be totally prevented, the end surface 36 should be at least as wide as the opening of the filtrate tube 24 on the side of the distribution chamber 26. If the end surface 36 is wider, the flow can be prevented for a while. For equalizing the rate of change of the vacuum, the end surface 36 can be either perforated or beveled, notched, or its edge can be formed so that it is not exactly parallel to or similar in form with the longitudinal edge of the filtrate tube 24.

In FIG. 4 the gas discharge channel 43 is connected to a pipe 37 joining the valve 40 and a flange 48 for mounting it to the suction leg 90, which pipe is located inside the suction leg 90 and keeps the valve 40 in position. The gas discharge channel 43 is not inevitable for implementing the invention and also some other stream may be led into the pipe 37. Especially when the valve is implemented in a new structure, the connecting flange 48 (FIG. 5) can be united directly with the valve 40 without the pipe 37 connecting the valve 40 and the fixing flange 28. Then the valve 40 can be fixed to the frame of the apparatus without having the horizontal pipe of the suction leg 90 between the fixing flange 48 and the valve 40.

Due to the mode of operation of the valve 40 and the structure of the drum 12, intensified suction cannot be directed to continuously begin exactly at a certain angle of rotation of the drum 12. Intensified suction, like other different pressure levels controlled by the valve 40 is directed onto the filtering surface of the drum 12 within an area located on the filtrate compartment 20 at a time. Therefore, it is not possible to exactly define the area where the intensified suction is directed in certain angles of rotation, but it is to be defined as angle positions, where opening and closing of the connection between the channels 41, 42 of the valve and the filtrate tube 24 takes place.

In situations, where the necessity of aligning the initial or terminal point of intensified suction is determined by a exactly defined rotation angle, i.e. for instance the surface 11 of the suspension, the position of the scraper 32 or the initial point of washing, the aligning is to be adapted taking into account the portion of the filtrate compartments in the rotation angle. When earlier starting of the washing requires intensified suction, this suction is often to be directed so that intensified suction is directed to the filtrate compartments 20 in each situation prior to starting the washing or prior to some other critical point. Thus, if the washing is initiated as early as at the point of the surface 11 of the suspension, the opening of the filtrate tube 24 leading into the filtrate compartment 20 has to come to the place of the channel 41 of intensified suction at the latest when the first edge of the filtrate compartment 20 is at the surface 11 of the suspension. When there is no clearly defined and critical changing point such as the starting point of sector A or C, the positioning can be determined as average, i.e. as the position of the center line of the filtrate compartment 20 and not according to the first edge of the filtrate compartment 20 when the channel 41, 42 or 43 is opened or closed. Because the positioning can be accomplished only cyclically per filtrate compartment, the invention is better operative in a suction drum washer than in a disc washer usually having an essentially smaller number of segments corresponding to the filtrate compartments 20 than the drum washers.

The influence of intensified suction on the pulp layer 30 on the surface takes place with a delay. If the intensified suction is not directed to sector A, there may be a need to set an advance of e.g. 5 degrees in view of the hitting point of the washing liquid spray 72 depending on the conditions, to ensure that e.g. adequate compacting of the pulp layer 30 is as a whole adequate to tolerate the washing in sector B. But, on the other hand, since in the initial stage of the washing the pulp layer 30 is not necessarily damaged right at the hitting point of the first washing liquid spray 72 although it was momentarily without the influence of intensified suction, this advance may not necessarily be needed. Also the fact that another part of the filtrate compartment 20 has already been under the influence of intensified suction longer than its leading edge, decreases the need for an advance. Since the advanced washing initiates within 10 degrees after the filtering stage, the delay effect of the compacting of the pulp layer 30 due to intensified suction directed to the latter end of the filtering stage II is often adequate for allowing starting of the washing earlier than conventionally without damaging the pulp layer and without directing the intensified suction to the washing stage.

Preferably the position of the valve 40 can be rotated around the axis of the drum 12 with respect to the frame of the apparatus so that the directing of intensified suction sectors A, B and C can be adjusted to take place earlier or later. The positions of all the stages are moved simultaneously, whereby the position of the scraper 32 limits the changing of the border between the drying stage IV and the discharge stage V to a later point. Setting it to a too early a point may lead to incomplete drying as the drying terminates too early. FIG. 5 illustrates a way to accomplish an adjustment. The valve is attached to the frame of the apparatus or, in this case, to the suction leg so that the spacing of the bolt holes 44 of the connecting flange 48 is narrower than the spacing of the bolts on the side of the frame or the suction leg. Then the bolts 45 can be removed and the valve 40, can be attached e.g. to an angle that is e.g. 5 degrees in advance or to a later position in the rotational direction 27.

The position of the valve can be turned for changing the directing also by means of turning the pipe 37 that connects the mounting flange 48 and the valve 40, if the pipework 28 connected to the pipe allows this turning. This turning can be accomplished e.g. by arranging around the connecting pipe 37 a split sleeve that is connected to the connection flange 48. By opening this clamping collar around the sleeve the pipe 37 can be turned steplessly even during operation.

Placing a second pipe onto or into the pipe 37 joining the mounting flange 48 and the valve 40 allows separate moving of the intermediate walls that have an effect on the intensified suction, or also other intermediate walls 34, or channels 41, 42 or 43, if they have been attached to this separately turnable pipe. If the outer pipe is stationary, it is to be provided with suitable grooves to allow motion of the connecting members therethrough. If the outer pipe accomplishes the adjustment motion, these grooves are not necessary.

FIGS. 4 and 5 illustrate a way of adjusting the directing of the intensified suction sector by sector. FIG. 4 shows a female thread 39 attached to the frame of the apparatus, the mounting flange 48 or the suction leg 90, through which female thread a threaded shaft 35 adapted thereto passes. A channel component 38 comprising two intermediate walls 34 and a casing for filtrate flow coming from the channel 41 is attached to one end of the threaded shaft 35. The channel component 38 is mounted to the connecting pipe 37 of the valve 40, in relation to which pipe it may turn, since its mounting screws are located in grooves that are transverse with respect to the axis of the connecting pipe 37. By turning a hand wheel 49 on the other end of the threaded shaft 35, the channel component 38 directing the flow of the suction is rotated and other intermediate walls of the valve 40 remain in their positions. Also other known components providing a linear motion, such as gas or hydraulic cylinders can be used as adjustment member. FIG. 5 illustrates how the channel component 38 is connected by means of a movable flange connection to a line pipe 55 that withdraws filtrate from sectors A and B using intensified suction. The flange connection has grooves for screw holes and an elongated hole 46 of the connection flange 48, which allow rotating the channel component 38 at the end whereto the valve is connected. No motion with respect to the connecting flange 48 is needed, if the channel component 38 is connected to the connecting flange 48 flexibly, e.g. by means of a hose.

In addition to said two intermediate walls 34, also the position of any single intermediate wall or several intermediate walls 34 could be controlled together or separately in a corresponding way. This is limited by the fact that the filtrate flow and pressure level are to be sealed and channeled separately from other channels. This can be accomplished as shown in FIG. 4, i.e. one zone of intensified suction with its intermediate walls 34 is arranged to be solid and separately movable. If it is desired to effect on the width of the intensified suction sector, that can be accomplished e.g. by replacing this channel component 38 by another component having a directing opening of different width. Otherwise it is necessary to use flexible, or some other joints that are more difficult to seal, between the intermediate walls 34 or the valve 40.

Corresponding filtrates from each sector separated by two adjacent intermediate walls can be led separately to processes where they are suitable, most preferably as such. For instance, filtrate from washing stage III coming from between sectors B and C in FIG. 1, which is of average clarity, can be better used separate than combined with fouler filtrate from suction leg 90. It may even be possible to feed it into the first washing pipe 72 of the apparatus as such or in diluted state. As vacuum source, a suitable pump or a separate suction leg leading to a separate filtrate tank can be used, which as being separate, can be dimensioned to correspond to the vacuum level desired from the washing stage.

When there is no suitable object of use for the filtrates, the valve 40 and the filtrate channels can be kept simple and all flows having the same vacuum level can be combined. Then one suction leg withdraws the filtrates of the filtering stage II and the washing stage III and the channel of intensified suction withdraws the filtrates and gases produced by sectors A, B and C of intensified suction.

FIG. 6 illustrates a preferred solution for the vacuum system of intensified suction. A vacuum pump 100 produces a more intense vacuum that the suction leg 90 via a gas space, which is common for parts 54 and 65 of the tank, to the sectors A, B and C of intensified suction. An intensified suction is formed when combined filtrate produced by the sectors A, B and C is withdrawn from the sectors via pipe line 55 into part 56 of the filtrate tank, the lower part of which is split, and from sector C the filtrates are withdrawn via pipe line 53 into part 54 of the tank.

The vacuum produced by the vacuum pump 100 can be led to control the vacuum of the suction leg, if needed, e.g. to remove air entrained in the suction leg 90 and to thus adjust its vacuum level constant. This might require mounting a chamber above the suction leg 90, into which gases would rise and the pressure level of which would be maintained by means of the vacuum pump 100. Air-removal and filtering could be intensified in the air-removal sector I by providing there at least a slight vacuum by means of the vacuum pump 100 or a fan. These solutions could provide benefit also in connection with a usual washer.

The vacuum provided by the vacuum pump 100 for the sectors of intensified suction and other objects can be adjusted to be optimal for each stage, if needed, by restricting the flow coming from each source by means of regulation valves.

The vacuum pump 100 may comprise more than one pump and the vacuum it creates may be generated stagewise with various types of pumps, as is usual in vacuum technique. In such a case this staging can be utilized so that different destinations receive directly vacuum at a suitable level produced from different vacuum levels. Vacuums for each sector of intensified suction can also be produced by separate and different vacuum levels adapted for each destination, including the suction leg.

There are also other known alternatives for the vacuum arrangements, in addition to the vacuum pump 100 and the suction leg 90. One alternative is to withdraw the filtrates separately or combined e.g. by means of pump arrangements according to publication FI87538, which use a gas-removing centrifugal pump. The amount of gas entering the filtrate from sectors A and B is negligible, and so it can, depending on the conditions, be withdrawn by means of a conventional liquid pump and simultaneously a desired vacuum can be created. If the level of filtrate coming from the filtrate tubes from sector C does not sink to the level of the distribution chamber, the amount of air coming from that sector into the filtrate is not harmful and the vacuum source can also then be a liquid pump.

FIG. 6 illustrates a method of distributing the filtrates from various stages of the washer. Earlier filtrates of one and the same vacuum washer have been used only for dilutions of the suspension and for washing the wire. Filtrate to these has been pumped from the filtrate basin 50 via pipe lines 51 and 52.

From the sectors of intensified suction A, B and C the filtrates that have converted to foam- and gas-free form are pumped from tank parts 54 and 56 separately e.g. by means of conventional centrifugal pumps for further use. E.g. the first washing pipe 70 may receive filtrate of the drying stage IV from sector C via pipe line 58 as such and at least in diluted form to latter washing pipes 60, if the flow amount is adequate for that. When clean liquid is led into a same washing pipe as filtrate, back valves are to be used to prevent the filtrate from pipe line 58 from entering the pipe line 57 for clean liquid and preventing clean liquid from entering the pipe line 58.

Filtrates from sectors A and B are pumped into filtrate basin 50, which is common with the suction leg 90. Filtrate coming from sectors A and B, the filtrate portion 50 of which is cleaner than liquid, could usually also be pumped into pipe line 52 leading to pipe 75 for washing the wire.

The height of the level of tank parts 54 and 56 should be monitored in order to prevent them from drying or leaking their contents into each other, at least preventing fouler filtrate from entering the part for cleaner filtrate. When filtrate is led elsewhere and not into the filtrate basin 50, these destinations are to be provided with a parallel liquid feed in order to prevent disturbance of the process due to inadequate amount of filtrate. Correspondingly, a discharge connection is to be arranged e.g. in the filtrate basin 50, if the filtrate cannot be used otherwise to an adequate extent and the basin would get overfilled.

Because of added washing pipes and intensifying the washing, also other liquid, either diluted or as such depending on the case, can be led into the first washing pipe 70, e.g. filtrate of washing stage III from a segment between the intensified washing sectors or some external liquid from outside the apparatus. Then the filtrate of sector C would be circulated to the second, and in diluted form perhaps also to a later washing pipe 60.

Although the above description relates to embodiments of the invention that in the light of present knowledge are considered the most preferable, it is obvious to a person skilled in the art that the invention can be modified in many different ways within the broadest possible scope defined by the appended claims alone.

The invention claimed is:

1. A method of washing a pulp suspension comprising:
    supplying a pulp suspension to a drum inside a basin of a washing unit, the washing unit includes a plurality of washing pipes that supply washing liquid spray, a suction leg that creates a vacuum on an inner surface of the drum, pipelines that provide washing liquid, and at least one vacuum source that produces an intensified suction to less than three sectors on the drum, the intensified suction creates a vacuum that is at least 0.1 bar higher than the vacuum created by the suction leg;
    submerging the drum partly in the pulp suspension inside the basin, the drum including a filtering surface on an outer periphery of the drum on which pulp accumulates, filtrate compartments under the filtering surface, a distribution chamber inside the drum along a rotating axis of the drum having a valve inside the distribution chamber that directs intensified suction to sectors on the drum;
    rotating the drum partly submerged in the pulp suspension with a vacuum directed to the drum produced by the suction leg and intensified suction directed to sectors of the drum produced by the at least one vacuum source;
    accumulating a pulp layer on the filtering surface of the drum while the drum is submerged in the suspension, wherein an outer surface of the pulp layer is at atmospheric pressure and an inner surface of the pulp layer is adjacent the filtering surface;
    washing the pulp layer by spraying washing liquid onto the pulp layer, a first washing liquid spray is located between a surface of the suspension and 10 degrees above the surface of the suspension, wherein the 10 degrees is measured from the surface of the suspension to the washing liquid spray in the direction of rotation of the drum;
    drying the washed pulp layer;
    discharging the dried pulp layer from the filtering surface of the drum; and
    washing the filtering surface of the drum.

2. The method of claim 1, wherein an entire or a partial first sector of the filtrate compartment receives intensified suction, the intensified suction begins at no less than 10 degrees below the surface of the suspension, and the sector terminates at the surface of the suspension.

3. The method of claim 1, wherein an entire or a partial second sector of the filtrate compartment receives intensified suction, the sector begins at the surface of the suspension and terminates between about 10 to 20 degrees above the location of the first washing liquid spray.

4. The method of claim 1, wherein an entire or partial third sector of the filtrate compartment receives intensified suction beginning after a last washing liquid spray, and terminating within a drying stage of the drum.

5. The method of claim 1 wherein the valve comprises intermediate walls that define valve channels within two intermediate walls, and wherein the valve channels direct the intensified suction to the sectors.

6. The method of claim 1 wherein the sectors include a first sector and a second sector, and further comprising a hand wheel to control intensified suction to the first and second sectors by being connected to a channel component comprising two intermediate walls and a casing for filtrate flow in the valve channel that is directed to a first and second sectors, and the hand wheel is adapted to rotate and control the relative size of the channel component, and positions of the intermediate walls are either controlled together or separately in a corresponding way.

7. The method of claim 1, wherein the intensified suction is formed by the withdrawal of filtrate from the sectors via pipelines, and the filtrate withdrawn from the sectors is recirculated and used as washing liquid.

8. The method of claim 1, wherein a first sector and a second sector receive intensified suction that is directed by a single suction channel.

9. The method of claim 1 wherein the steps of washing the pulp layer, drying the washed pulp layer, and discharging the dried pulp layer from the filtering surface of the drum are performed while an outer surface of the pulp layer is under atmospheric pressure.

10. A method for washing pulp in a suction washer having a basin, a rotating drum having an annular outer filtering surface, and a suction leg, the method comprising:
    as the drum rotates the filtering surface through the pulp suspension, forming a pulp layer on the filtering surface by applying by suction to filtrate compartments internal to the drum and adjacent a portion of the filtering surface submerged in the suspension;
    as the drum rotates the filtering surface above the pulp suspension and the filtering surface is within ten degrees in the direction of rotation of a surface of the pulp suspension, spraying a liquid onto the pulp layer and drawing the liquid through the pulp layer by applying suction into the filtrate compartments adjacent a portion of the filtering surface aligned with the spraying;
    as the drum rotates the filtering surface beyond the spraying, drying the washed pulp layer on the filtering surface by applying suction to draw the liquid into the filtrate compartments adjacent a portion of the filtering surface beyond the spaying and above the surface of the pulp suspension;
    as the drum rotates beyond the drying, removing the dried pulp layer from the filtering surface and suppressing the suction applied to the filtrate compartments adjacent a portion of the filtering surface aligned with the removal of the pulp layer;

applying the suction at a first pressure difference during at least the drying by flowing the liquid from the filtrate compartments down through a suction leg pipe and into a filtrate basin below the drum, and applying the suction during at least a portion of the forming of the pulp layer and the spraying of the pulp layer by applying a second pressure difference to the pulp layer, wherein the second pressure difference is greater than the first pressure difference, wherein the first and second pressure differences are each a pressure difference between a pressure applied to an outer surface of the pulp layer and a pressure applied to an inner surface of the pulp layer facing the filtering surface.

* * * * *